United States Patent
Reyna

(10) Patent No.: US 10,710,646 B2
(45) Date of Patent: Jul. 14, 2020

(54) TRUCK BED EXTENSION ASSEMBLY

(71) Applicant: Joshua Reyna, San Antonio, TX (US)

(72) Inventor: Joshua Reyna, San Antonio, TX (US)

( * ) Notice: Subject to any disclaimer, the term of this patent is extended or adjusted under 35 U.S.C. 154(b) by 0 days.

(21) Appl. No.: 15/926,692

(22) Filed: Mar. 20, 2018

(65) Prior Publication Data
US 2018/0362099 A1 Dec. 20, 2018

Related U.S. Application Data

(60) Provisional application No. 62/519,915, filed on Jun. 15, 2017.

(51) Int. Cl.
B62D 33/03 (2006.01)
B62D 33/037 (2006.01)
B62D 33/08 (2006.01)
B62D 33/027 (2006.01)

(52) U.S. Cl.
CPC .......... B62D 33/08 (2013.01); B62D 33/027 (2013.01); B62D 33/0273 (2013.01)

(58) Field of Classification Search
CPC .. B62D 33/027; B62D 33/0273; B62D 33/03; B62D 33/033; B62D 33/037; B62D 33/08
USPC ........................................ 296/57.1, 26.11, 62
See application file for complete search history.

(56) References Cited

U.S. PATENT DOCUMENTS

| | | | | |
|---|---|---|---|---|
| 2,872,239 A | * | 2/1959 | Bowness | B62D 33/08 296/26.11 |
| 4,531,773 A | * | 7/1985 | Smith | B62D 33/0273 224/403 |
| 5,806,907 A | * | 9/1998 | Martinus | B62D 33/0273 296/26.11 |
| 5,857,724 A | * | 1/1999 | Jarman | B62D 33/0273 296/26.11 |
| 6,378,926 B1 | * | 4/2002 | Renze | B60P 3/40 296/183.1 |
| 6,422,627 B1 | * | 7/2002 | Kuhn | B60P 3/40 296/26.1 |
| 6,422,630 B1 | * | 7/2002 | Heaviside | B62D 33/0273 296/26.11 |
| 6,550,841 B1 | * | 4/2003 | Burdon | B60P 3/40 296/26.11 |
| 7,021,689 B1 | * | 4/2006 | Weisbeck, III | B62D 33/0273 296/26.11 |
| 8,109,552 B2 | * | 2/2012 | Nelson | B62D 33/0273 224/403 |
| 8,182,012 B1 | * | 5/2012 | Brister | B60P 3/40 296/26.11 |
| 9,302,717 B1 | * | 4/2016 | Rude | B60P 3/40 |
| 9,452,793 B1 | * | 9/2016 | Quick | B62D 33/0273 |
| 9,809,142 B1 | * | 11/2017 | White | E05B 83/20 |
| 9,834,260 B2 | * | 12/2017 | Quick | B62D 33/0273 |
| 9,956,996 B2 | * | 5/2018 | Astrike | B60P 7/02 |

(Continued)

Primary Examiner — Gregory A Blankenship

(74) Attorney, Agent, or Firm — Brandon T. Cook; Gunn, Lee & Cave, P.C.

(57) ABSTRACT

A tailgate assembly capable of extending the volume of a truck bed having a first panel with a first end and a second end, with the first end rotatably connected to a truck bed, a second panel with a first end, a second end, and at least one side end, with the first end of the second panel rotatably connected to the second end of the first panel, and at least one folding panel rotatable connected to a side end of the second panel.

1 Claim, 5 Drawing Sheets

(56) References Cited

U.S. PATENT DOCUMENTS

| | | | |
|---|---|---|---|
| 2006/0214449 A1* | 9/2006 | Klusmeier | B62D 33/0273 296/26.11 |
| 2010/0026027 A1* | 2/2010 | Gao | B62D 33/0273 296/26.11 |
| 2014/0333083 A1* | 11/2014 | Bzoza | B60R 5/041 296/26.11 |
| 2015/0225024 A1* | 8/2015 | Newberry | B62D 33/0273 296/26.11 |
| 2016/0185396 A1* | 6/2016 | Castillo | B62D 33/03 296/26.11 |
| 2018/0362099 A1* | 12/2018 | Reyna | B62D 33/08 |

* cited by examiner

TRUCK BED EXTENSION ASSEMBLY

CROSS-REFERENCES TO RELATED APPLICATIONS

This application claims the benefit of provisional patent application No. 65/519,915.

STATEMENT REGARDING FEDERALLY SPONSORED RESEARCH OR DEVELOPMENT

Not applicable.

BACKGROUND OF THE INVENTION

Field of the Invention

A Pickup truck is a vehicle with a generally rectangular cargo area, called a truck bed, in the rear. The bed is formed by a front wall adjacent the truck cabin, two side walls, a bottom wall, and a tailgate in the rear. The tailgate opens and closes to increase the accessibility of the truck bed. The present invention generally relates to a low profile folding assembly which can increase the volume of a truck bed when desired.

SUMMARY OF THE INVENTION

The truck bed extension assembly comprises hinges, panels, hooks, latches, release mechanisms, and pins to allow the user of a truck to open the tail gate, unfold the tailgate to reveal extension panels, and arrange the extension panels to increase the volume of the truck bed. The truck bed extension assembly is contained within, or is part of, the traditional truck bed and tailgate. This allows the user to extend the truck bed when desired, without sacrificing any volume inside the un-extended truck bed, and without sacrificing the aesthetic appeal of a traditional truck bed.

DETAILED DESCRIPTION

Figure 1:
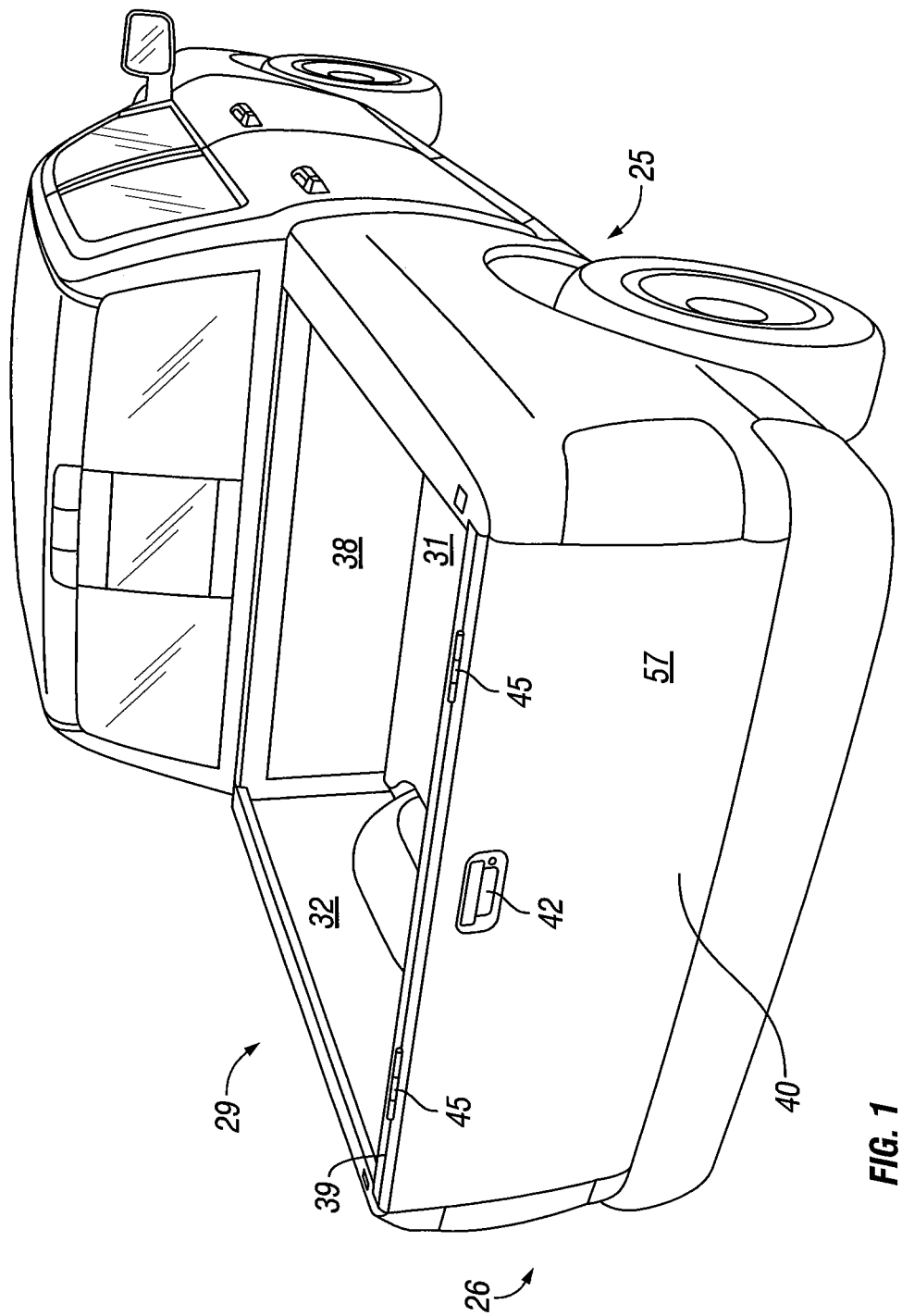
FIG. 1 is a perspective view of the truck bed extension assembly in the un-extended and closed position, with the surrounding truck environment shown for context.
Figure 3:
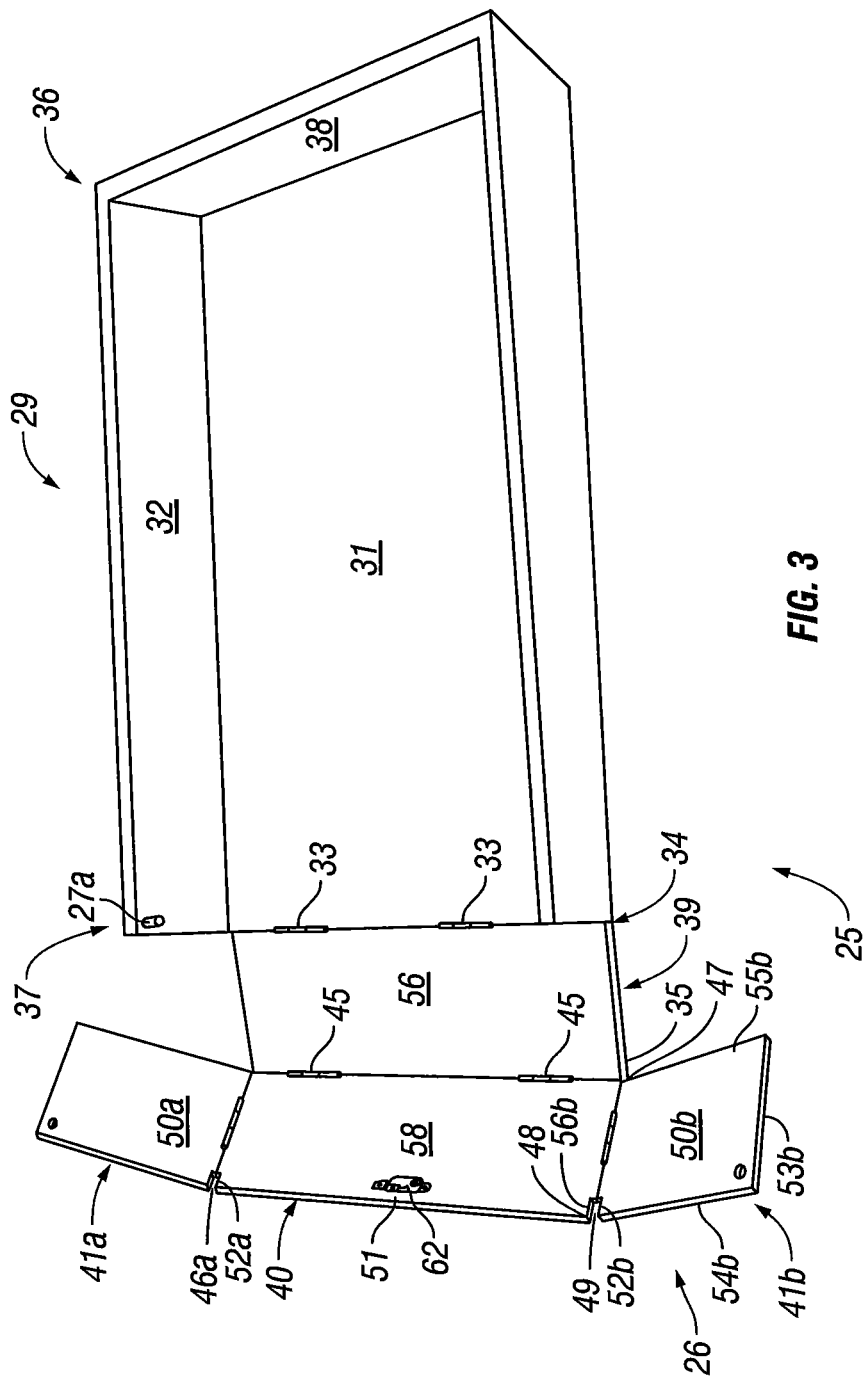
FIG. 3 is a perspective view of the truck bed extension assembly with the tail gate assembly partially unfolded.

Referring to FIGS. 1 and 3, the truck bed extension assembly 25 comprises a tailgate assembly 26 and a truck bed 29.

The truck bed 29 has a bottom wall 31, two side walls 32, and a front wall 38. The truck bed has a front end 36 and a rear end 37. Two pins 27 extend from opposing sidewalls 32 of the truck bed 29. The pins 27 are located near the corner of the sidewalls 32 proximate the rear end 37 and distal the bottom wall 31. The pins 27 are perpendicular to the sidewalls 32 and protrude approximately 2.5 inches from the sidewalls. Ideally, the pins 27 are the pins used in a traditional tailgate, and no alteration or additional equipment is necessary.

Figure 4:
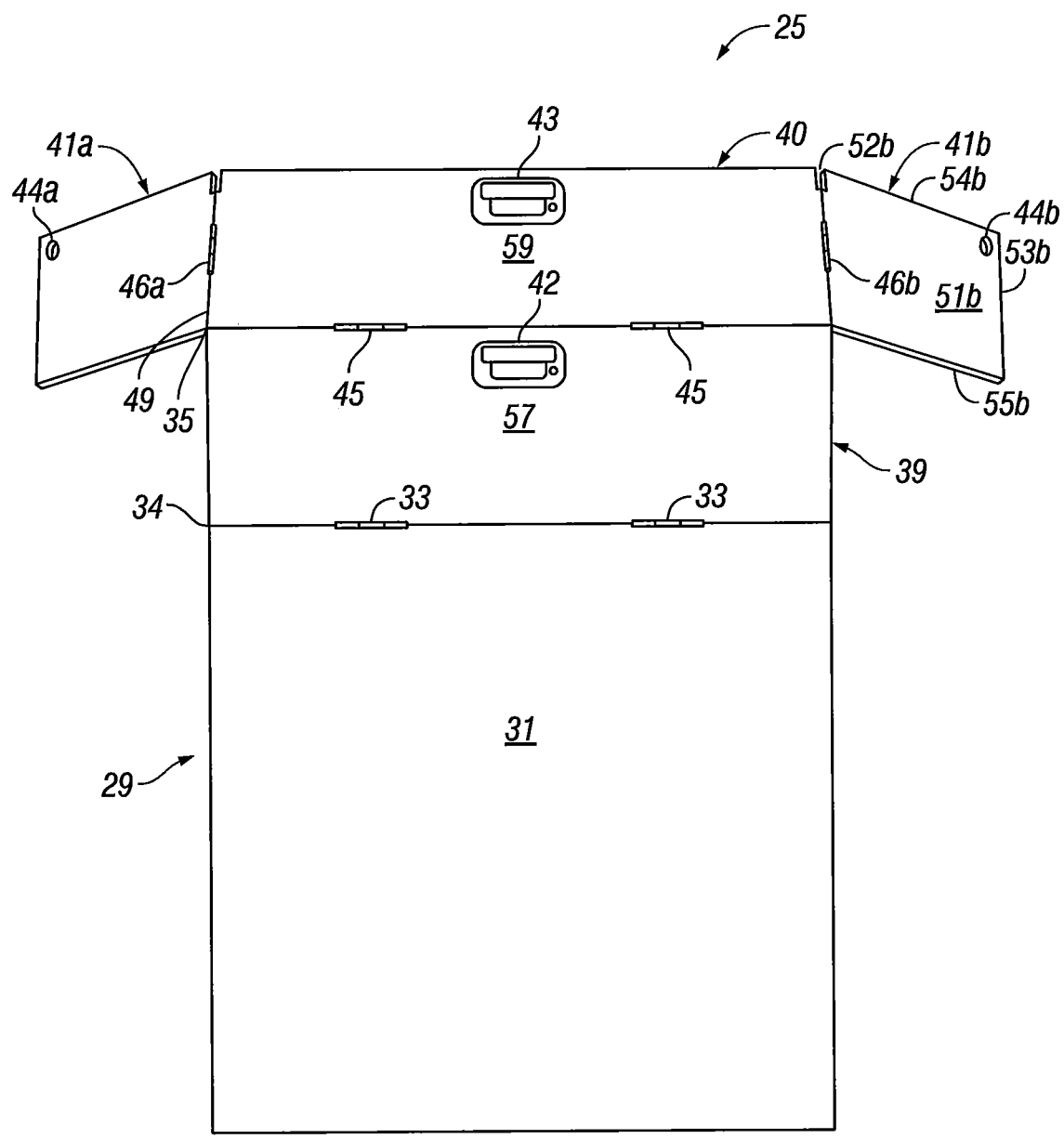
FIG. 4 is a bottom view of the truck bed extension assembly with the tail gate assembly partially unfolded.

Referring to FIGS. 3 & 4, the tailgate assembly 26 comprises a first panel 39, a second panel 40, and two folding panels 41, a first release mechanism 42, a second release mechanism 43, two rubber grommets 44, a first latitudinal set of hinges 33, a second latitudinal set of hinges 45, and two longitudinal sets of hinges 46.

The first panel 39 has a first end 34 proximate the bottom wall 31 of the truck bed 29, a second end 35 distal the bottom wall 31, a first surface 56 and a second surface 57. The first end 34 of the first panel 39 is hingedly connected to the bottom wall 31 of the truck bed 29 by the first latitudinal set of hinges 33.

The second panel 40 has a first end 47 proximate the second end 35 of the first panel 39, a second end 48 opposite the first end 47, two side ends 49, a first surface 58, and a second surface 59. The first end 47 of the second panel 40 is hingedly connected to the second end 35 of the first panel 39 by the second latitudinal set of hinges 45. A set of opposing tailgate latches (not shown) are integral the second panel 40 proximate the corners formed by the second surface 59 and the first end 47. Ideally, the set of opposing tailgate latches are the latches used in a traditional tailgate to attach the tailgate to the pins 27, and no alteration or additional equipment is necessary. A panel latch 62 is integral the first surface 58 of the second panel 40. The panel latch 62 is proximate the second end 48 of the second panel 40 and centrally located on the horizontal axis of the panel 40. The panel latch 62 connects to a pin or other type of catch mechanism (not shown) integral the first surface 56 of the first panel 39.

The folding panels 41 have a first surface 50, a second surface 51, a first end 52, a second end 53, a first edge 54, and a second edge 55. The first edge 54 of the folding panels 41 is coplanar with the second end 48 of the second panel. The second edge 55 of the folding panels is opposite the first edge 54. The first end 52 of the folding panels 41 are hingedly connected to side ends 49 of the second panel 40 by longitudinal hinges 46. A rubber grommet 44 is attached to the second surface 51 of the folding panels 41 proximate the corner of the folding panel 41 formed by the second end 53 and first edge 54.

A first release mechanism 42 is integral the second surface 57 of the first panel 39 proximate the second end 35. Ideally, the first release mechanism 42 is a release handle used in a traditional tailgate, and no alteration or additional equipment is necessary. The second release mechanism is integral to the second surface 59 of the second panel 40.

Figure 2:
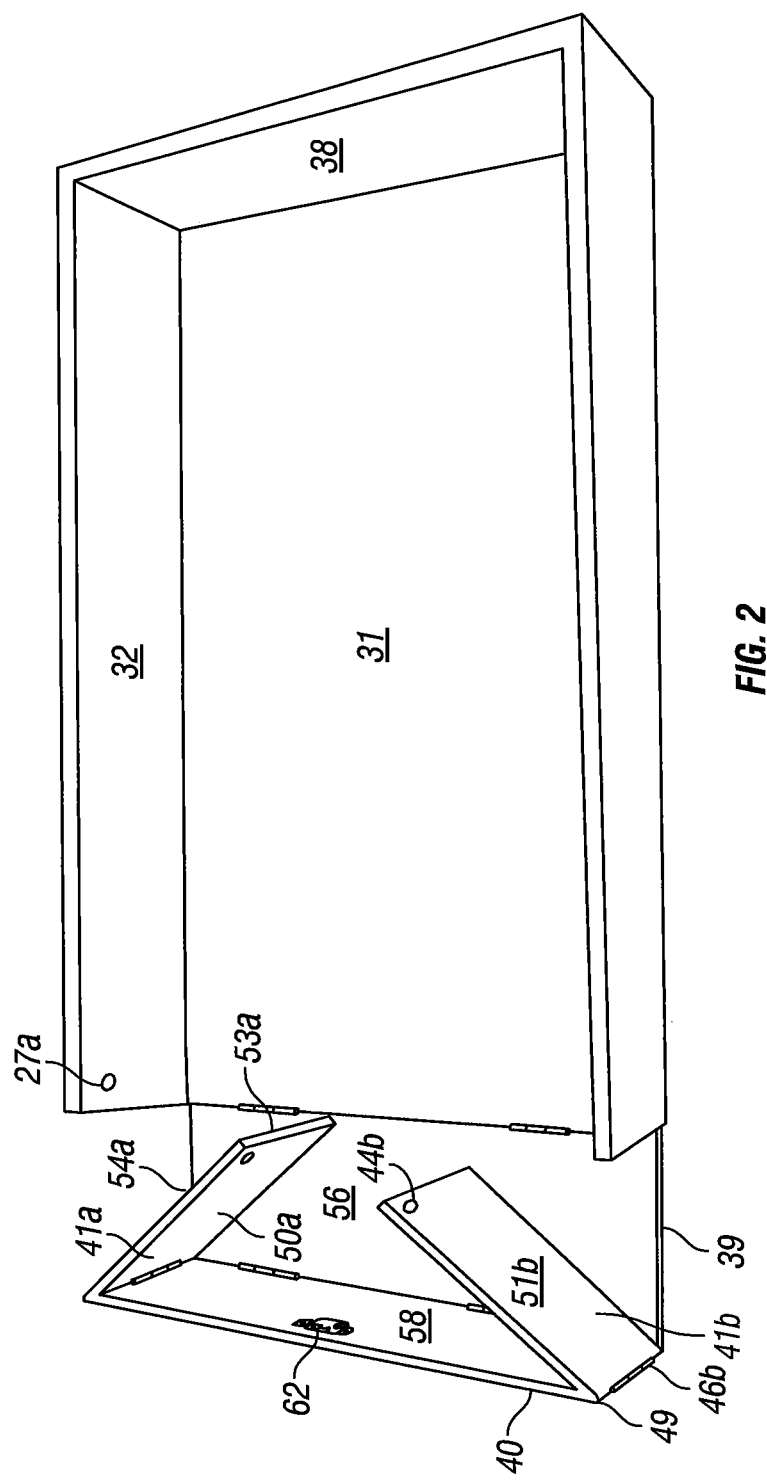
FIG. 2 is a perspective view of the truck bed extension assembly with the tailgate assembly partially unfolded.

Referring to FIGS. 1 and 2, the structure of the truck bed extension assembly 25 in the un-extended position is described as follows. The folding panels 41 are hinged inward towards the second panel 40 so that the first surface 50 of the folding panels 41 are adjacent the first surface 58 of the second panel 40. The second panel 40 is hinged toward the first panel 39 so that the second surfaces 51 of the folding panel 41 and exposed portions of the first surface 58 of the second panel 40 are adjacent the first surface 56 of the first panel 39. The panel latch 62 connects the first panel 39 and second panel 40, enclosing the folding panels 41 between the first panel 39 and second panel 40.

Figure 5:
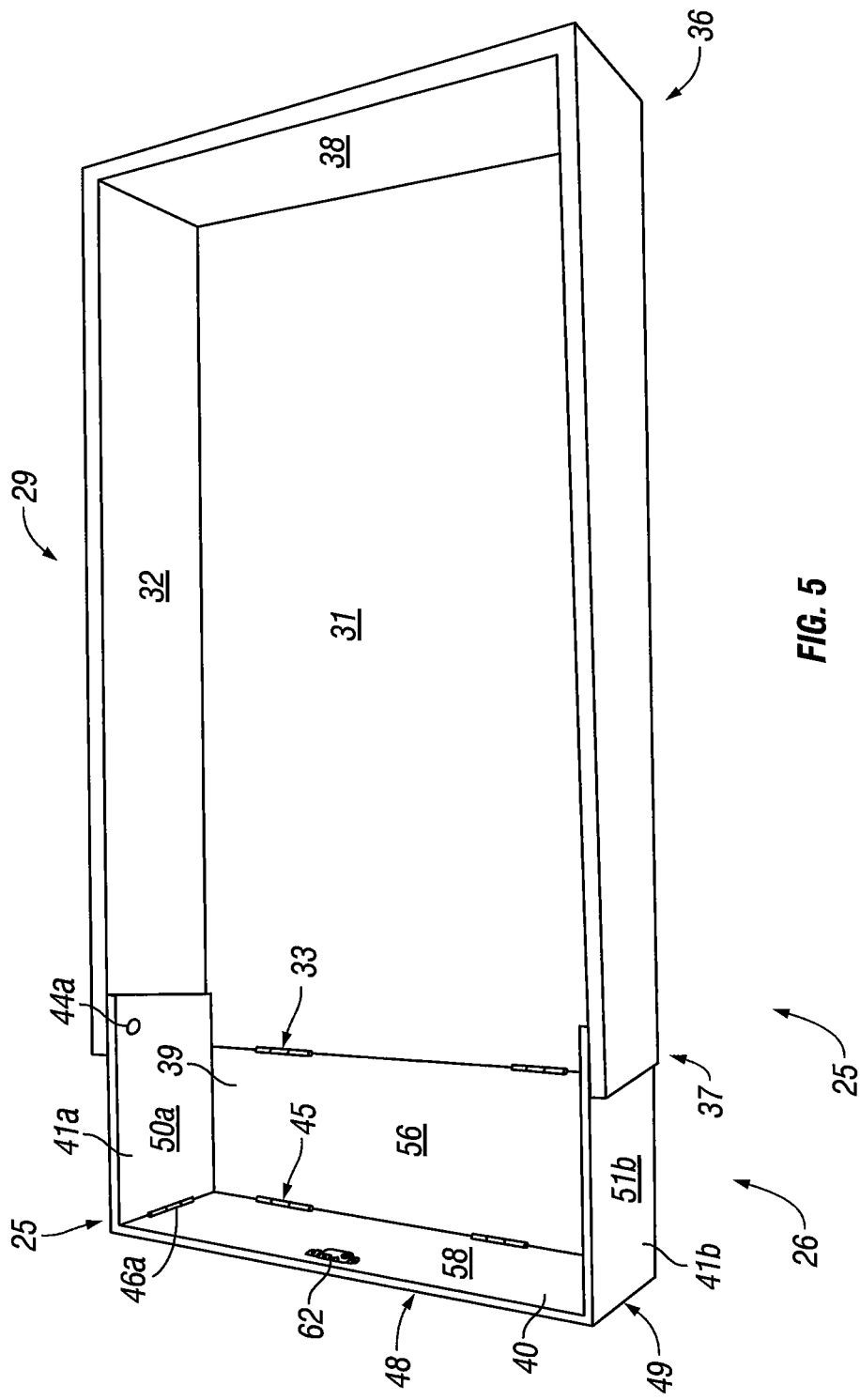
FIG. 5 is a perspective view of the truck bed extension assembly in the extended and closed position.

Referring to FIGS. 2 and 5, the structure of the truck bed extension assembly 25 in the extended position is described as follows. The first panel 39 is hinged away from the truck bed 29 and rests in the same horizontal plane as the bottom wall 31 of the truck bed 29. The second panel 40 is hinged upward and perpendicular to the first panel 39. The vertical plane of the of the second panel 40 is parallel to the vertical plane of the front wall 38 of the truck bed 29. The folding panels 41 are hinged away from the second panel 40 and the rubber grommets 44 of the folding panels 41 are attached to the pins 27 of the truck bed 29. The vertical plane of the folding panels 41 is parallel to the vertical plane of the side walls 32.

Cables (not shown) can be used to connect the tailgate panels to the truck or other tailgate panels in order to restrict to rotation angles of the panels.

Referring to FIGS. 1 and 3-5, the function of the truck bed extension assembly 25 will be explained as follows. Starting from the closed and un-extended position (see FIG. 4), a latch connection formed by the latches integral the tailgate assembly 26 and the pins 27 of the truck bed hold the tailgate assembly 26 in the closed position, thus creating a rear wall of the truck bed 29. The second surface 59 of the second panel 40 is the interior surface of the rear wall, and the second surface 57 of the first panel 39 is the exterior rear wall. The first release mechanism 42 releases the latch connection between the tailgate assembly 26 and the pins 27, allowing the folded tailgate assembly 26 to swing away from the truck bed 29.

The tailgate assembly 26 is hinged away from the truck bed 29 until the horizontal plane of the tailgate assembly 26 is parallel to the horizontal plane of the bottom wall 31 of the truck bed 29. The second release mechanism 43 releases the latch connection between the panel latch 62 and the first panel 39, thereby allowing the second panel 40 to hinge away from the first panel 39. The second panel 40 is hinged away from the first panel 39 until the second panel 40 is perpendicular to the first panel 39. The folding panels 41 are then hinged away from the second panel 40, and attached to the pins 27 of the truck bed 29 using rubber grommets 44.

When the user no longer desires an extended truck bed, the rubber grommets 44 are detached from the pins 27. The folding panels 41 are hinged towards the second panel 40 until the first surface 50 of the folding panels 41 are adjacent the first surface 58 of the second panel 40. The second panel 40 and folding panels 41 are hinged towards the first panel 39 until the panel latch 62 achieves a latch connection with the first panel 39, thereby securing the second panel 40 and folding panels 41 to the first panel 39.

The tailgate assembly resembles a traditional tailgate assembly when folded. Ideally, the second panel 40 and folding panels 41 are low profile and are only visible when the tailgate assembly 26 is unfolded.

I claim:
1. A tailgate assembly comprising:
a first panel with a first end and a second end, wherein the first end is integral a truck bed and rotatable relative the truck bed by a first set of hinges;
a second panel with a first end and a second end, a first side end, and a second side end, wherein the first end of the second panel is integral the second end of the first panel and rotatable relative to the second panel by a second set of hinges;
two side panels integral the first and second side ends of the second panel and rotatable relative the second panel by a third and fourth set of hinges;
first and second pins extending perpendicularly from opposing sidewalls of the truck bed;
a first release mechanism integral the first panel;
wherein the first release mechanism releases said second panel from said first and second pins, allowing the tailgate assembly to rotate on the said first set of hinges.

* * * * *